Feb. 24, 1925.
J. A. HAMILTON
RELIEF VALVE IN FAUCET
Filed Oct. 30, 1923
1,527,358
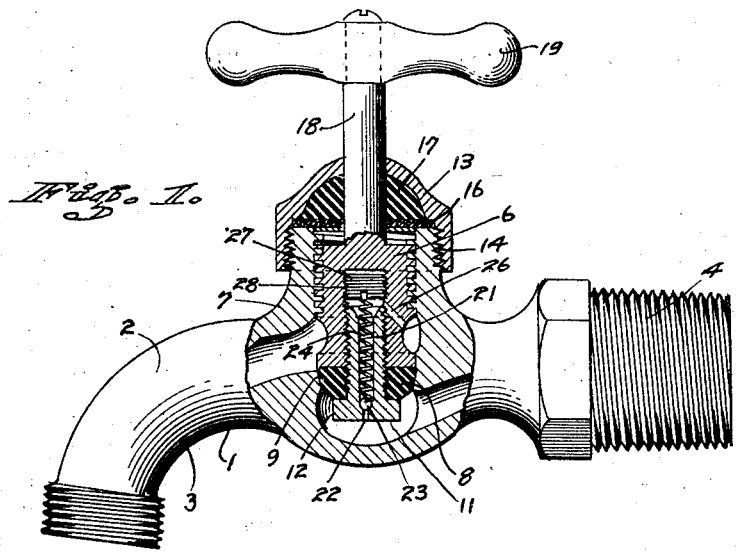
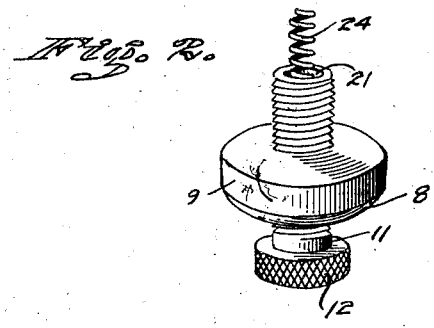
INVENTOR.
JOHN A. HAMILTON
BY
ATTORNEYS.

Patented Feb. 24, 1925.

1,527,358

UNITED STATES PATENT OFFICE.

JOHN ANDREW HAMILTON, OF FRESNO, CALIFORNIA.

RELIEF VALVE IN FAUCET.

Application filed October 30, 1923. Serial No. 671,715.

*To all whom it may concern:*

Be it known that I, JOHN ANDREW HAMILTON, a citizen of the United States, and a resident of Fresno, county of Fresno, and State of California, have invented a new and useful Relief Valve in Faucets, of which the following is a specification.

The present invention relates to improvements in faucets and its particular object is to add a relief valve to the common form of faucet now in every day use. The function of the relief valve is to serve as a safety device in case the pressure behind the valve is increased to such an extent as to render an explosion possible. My improved faucet is particularly adapted to be used for hot water connections, and allows the pressure medium when compressed beyond the point of safety to open the relief valve and to escape through a by-pass in the valve of the faucet through the spout.

The preferred form of the invention is illustrated in the accompanying drawing, in which Figure 1 shows a side view, partly in section, of a faucet provided with my relief valve, and Figure 2 a perspective view of a part of my improvement. While I have shown only the preferred form of my invention, I wish to have it understood that various changes or modifications may be made within the scope of the claims hereto attached without departing from the spirit of the invention.

The faucet (1) is constructed in the ordinary manner and comprises a spout (2) preferably bent as shown at (3) and threaded at its extreme end (4) so as to be adapted to be screwed into a pipe connection. The valve (6) is transversely threaded into the valve housing (7) and controls the port area of the spout by means of a washer (8) engaging the valve seat (9) when the valve is screwed downward. The washer is held in place by means of a screw (11) adapted to be threaded into the end of the valve in such a manner that its head (12) bears on the lower face of the washer and holds the same in contact with the bottom of the valve.

A cap (13) adapted to be screwed on the housing as shown at (14) with intervening washers (16) and (17) prevents the water from leaking past the valve stem (18) which latter is actuated by means of a handle (19).

The faucet thus far described is of conventional construction, and no novelty is claimed for the same. The principal idea of the present invention is the introduction of means for by-passing the pressure medium and for controlling the by-pass in such a manner that none of the pressure medium is allowed to escape until a certain degree of pressure is reached.

The by-pass is formed by a bore (21) in the screw (11) which bore is reduced in diameter toward the bottom, as shown at (22), to form a seat for the ball (23) which latter is normally forced against its seat by means of the spring (24). It will be seen that when the main valve is closed and the pressure behind the valve becomes sufficiently strong to overcome the tension of the spring, water will escape through the by-pass (24) communicating with the port of the spout through the passage (26), so that an excess of water or other pressure medium is allowed to escape through the by-pass. The upper end of the spring (24) bears on a plug (27) threaded into the recess (28) formed in the valve (6) and the tension of the spring may be adjusted by turning the plug (27) by means of a screw driver one way or the other.

It should be understood that any other suitable valve construction may be substituted for the ball valve shown in the drawing without departing from the spirit of the invention.

The operation of my faucet will be readily understood from the foregoing description. As long as the pressure behind the valve remains normal, the spring (24) is sufficiently strong to force the ball (23) on its seat so that no water escapes, provided the main faucet is closed. If the pressure due to heat or other reasons exceeds a desired degree, it becomes strong enough to lift the ball valve (23) off its seat and to allow a portion of the water to escape through the bore (21) and the passage (26) into the port of the spout.

It will be noted that the construction is very simple and requires only very little change as compared with the faucet as now used on the market.

I claim:

1. In a faucet of the character described, a valve seat, a valve, means for advancing the valve toward the seat, a washer on the valve, a screw extending through the washer and threaded into a recess in the valve for holding the washer in place and being formed with an axial bore, a shoulder in said bore allowing an auxiliary valve to rest thereon, and yielding means for seating the latter valve adapted to yield when the pressure exceeds a predetermined degree, the bore communicating with the discharge end of the faucet.

2. In a faucet of the character described, a valve seat, a valve, means for advancing the valve toward the seat, a washer on the valve, a screw extending through the washer and threaded into a recess in the valve for holding the washer in place and being formed with an axial bore, a shoulder in said bore allowing an auxiliary valve to rest thereon, yielding means for seating the latter valve adapted to yield when the pressure exceeds a predetermined degree, the bore communicating with the discharge end of the faucet, and a bearing element being threaded into said recess in advance of the screw for adjusting the tension of the yielding means.

3. In a faucet of the character described, a valve seat, a valve, means for advancing the valve toward the seat, a washer on the valve, a screw extending through the washer and threaded into a recess in the valve for holding the washer in place and being formed with an axial bore, a semi-spherical shoulder in said bore allowing a ball valve to rest thereon, and yielding means for seating the latter valve adapted to yield when the pressure exceeds a predetermined degree, the bore communicating with the discharge end of the faucet.

JOHN ANDREW HAMILTON.